United States Patent
Potschin et al.

(12) 
(10) Patent No.: US 6,224,032 B1
(45) Date of Patent: May 1, 2001

(54) PIEZOELECTRIC ACTUATED VALVE WITH MEMBRANE CHAMBER

(75) Inventors: Roger Potschin, Brackenheim; Friedrich Boecking, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/242,666

(22) PCT Filed: Feb. 18, 1998

(86) PCT No.: PCT/DE98/00476
§ 371 Date: Dec. 13, 1999
§ 102(e) Date: Dec. 13, 1999

(87) PCT Pub. No.: WO98/59169
PCT Pub. Date: Dec. 30, 1998

(30) Foreign Application Priority Data

Jun. 21, 1997 (DE) .............................................. 197 26 481

(51) Int. Cl.⁷ .................................................. F16K 31/165
(52) U.S. Cl. .................................................................. 251/57
(58) Field of Search .......................... 251/57, 14, 129.06, 251/61, 30.01, 30.02

(56) References Cited

U.S. PATENT DOCUMENTS

| | | | | |
|---|---|---|---|---|
| 4,491,296 | * | 1/1985 | Frank | 251/14 |
| 4,982,758 | * | 1/1991 | Schlachter | 251/57 X |
| 5,758,862 | * | 6/1998 | Sturman | 251/57 X |
| 5,772,181 | * | 6/1998 | Robertson, III | 251/129.06 |
| 5,857,661 | * | 6/1998 | Amada et al. | 251/57 |
| 6,062,532 | * | 5/2000 | Gurich et al. | 251/57 |

* cited by examiner

Primary Examiner—Kevin Shaver
Assistant Examiner—Eric Keasel
(74) Attorney, Agent, or Firm—Ronald E. Greigg; Edwin E. Greigg

(57) ABSTRACT

A valve for controlling fluids, which in order to be actuated, cooperates with a fluid-filled membrane actuator. A coupling chamber provided in the membrane actuator is sealed by two membranes as dividing walls. In order to compensate for fluid losses produced by pressure acting on the membrane actuator, a filling valve is provided, which is disposed in the region of one of the two membranes. A refilling of the membrane actuator during the closed phase of the control valve is assured by way of the filling valve. A filling of this kind can also compensate for length changes of the piezoelectric actuator, the valve, or the valve housing. The valve is designated for use in fuel injection devices for internal combustion engines of motor vehicles.

11 Claims, 3 Drawing Sheets

PIEZOELECTRIC ACTUATED VALVE WITH MEMBRANE CHAMBER

PRIOR ART

The invention relates to a valve for controlling fluids EP 0 477 400 has disclosed a valve of this kind. There, the actuation piston of the valve member is disposed so that it can move in a sealed fashion in a smaller diameter part of a stepped bore, whereas a larger diameter piston that is moved with the piezoelectric actuator is disposed in a larger diameter part of the stepped bore. A hydraulic chamber is fixed between the two pistons in such a way that when the actuator moves the larger piston by a particular distance, the actuation piston of the valve member is moved by a distance that is enlarged by the transmission ratio of the stepped bore diameter. The valve member, the actuation piston, the larger diameter piston, and the piezoelectric actuator are disposed in succession on a common axis.

With valves of this kind, there is the problem of compensating for length changes of the piezoelectric actuator, the valve, or the valve housing by means of the hydraulic coupling chamber, which will be referred to below as the pressure chamber for short. Since the piezoelectric actuator produces a pressure in the pressure chamber in order to open the valve, this pressure also leads to a loss of pressure chamber fluid. A refilling is required in order to prevent an evacuation of the pressure chamber. Devices that solve this problem have in fact already been disclosed (EP 0 477 400 A1), but in this instance, a valve is not provided for monitoring the refilling nor is anything said regarding whether the storage means can be refilled.

ADVANTAGES OF THE INVENTION

The valve according to the invention, has the advantage over the prior art that the pressure chamber suffers no fluid loss. A disadvantageous length change of the entire device is thus prevented, even if the piezoelectric actuator, the valve, or the housing changes its length, for example upon heating. Furthermore, the device has a simple design and a secure and reliable seal can be produced.

BRIEF DESCRIPTION OF THE DRAWINGS

A number of exemplary embodiments of the invention are shown in the drawings and will be explained in more detail in the description below.

DESCRIPTION OF THE EXEMPLARY EMBODIMENTS

Figure 1:
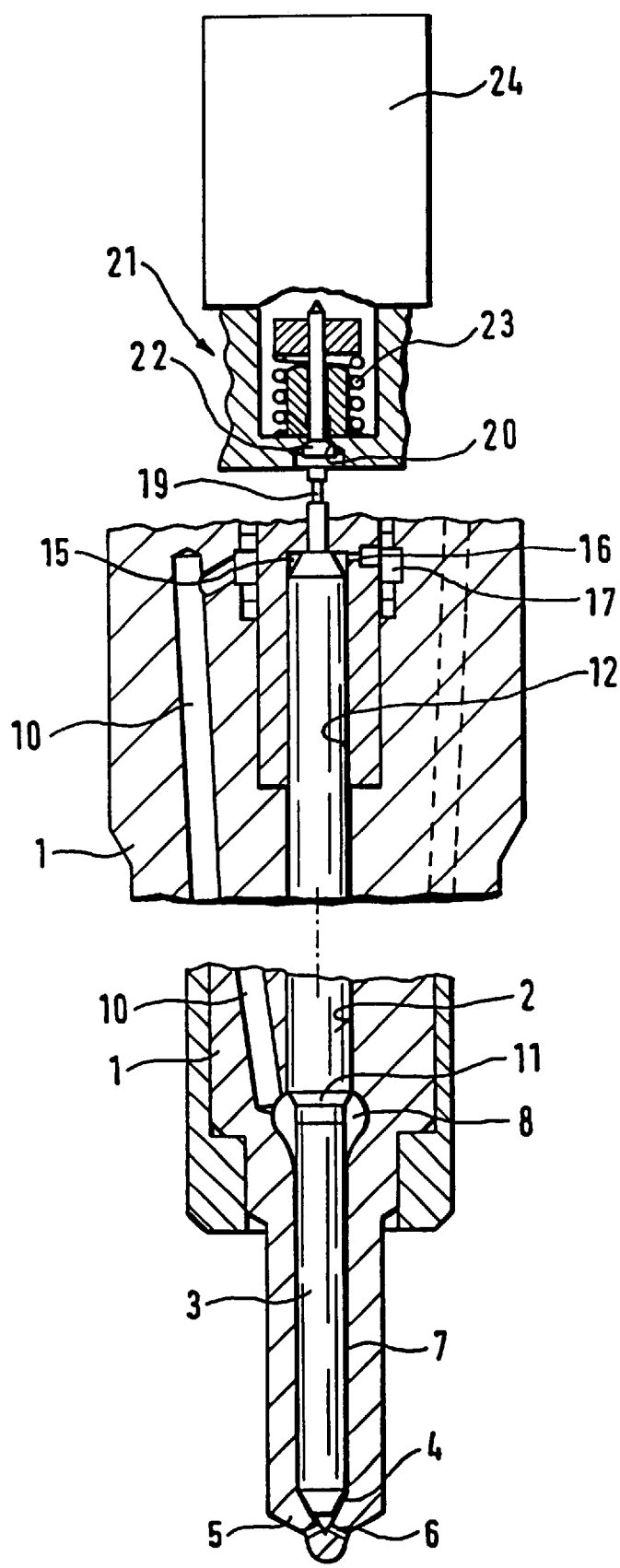
FIG. 1 shows a fuel injection valve in a sectional view.

The valve according to the invention is used in a fuel injection valve, the essential parts of which are reproduced in the sectional view in FIG. 1. This injection valve has a valve housing 1 in which a valve needle 3 is guided in a longitudinal bore 2. On its one end, the valve needle is provided with a conical sealing face 4, which cooperates with a seat at the tip 5 of the valve housing protruding into the combustion chamber, and injection openings lead from this seat and connect the inside of the injection valve, in this instance, the annular chamber 7 that encompasses the valve needle 3 and is filled with fuel at injection pressure, with the combustion chamber in order to thus carry out an injection when the valve needle has lifted up from its seat. The annular chamber communicates with another pressure chamber 8, which continuously communicates with a pressure line 10, via which the fuel injection valve is supplied with fuel at injection pressure from a high-pressure fuel reservoir that is not shown in detail. This high fuel pressure also prevails in the pressure chamber 8 and acts on a pressure shoulder 11 there, via which the valve needle can be lifted up from its valve seat in a known manner under suitable conditions.

At the other end of the valve needle, it is guided into a cylinder bore 12 and encloses a control pressure chamber 15 there with its end face 14, and by way of a throttle connection 16, this control pressure chamber continuously communicates with an annular chamber 17 which, like the pressure chamber 8, continuously communicates with the high pressure fuel chamber. A throttle bore 19 leads axially from the control pressure chamber 15 to a valve seat 20 of a control valve 21 in the embodiment according to the invention. The valve seat cooperates with a valve member 22 of the control valve and when this valve member 22 is forced downwardly away from the valve seat 20, produces a connection between the control pressure chamber 15 and a spring chamber 18, which is in turn continuously connected to a relief chamber. A compression spring 23, which loads the valve member 22 in the closing direction, is disposed in the spring chamber and thus acts on the valve member in the direction of the valve seat 20 so that in the normal position of the control valve, this connection of the control pressure chamber 15 is closed. Since the end face surface area of the valve needle in the region of the control pressure chamber is greater than the surface area of the pressure shoulder 11, the same fuel pressure in the control pressure chamber, which also prevails in the pressure chamber 8, now holds the valve needle 3 in the closed position. If the valve member 22, however, is moved from the valve seat 20, then the pressure is relieved in the control pressure chamber 15, which is uncoupled by way of the throttle connection 16. With the now insufficient closing force, the valve needle 3 opens rapidly and can on the other hand be brought into the closed position as soon as the valve member 22 comes back into the closed position. From this time on, the original high fuel pressure in the control pressure chamber 15 rapidly increases again by way of the throttle 16.

Figure 2:
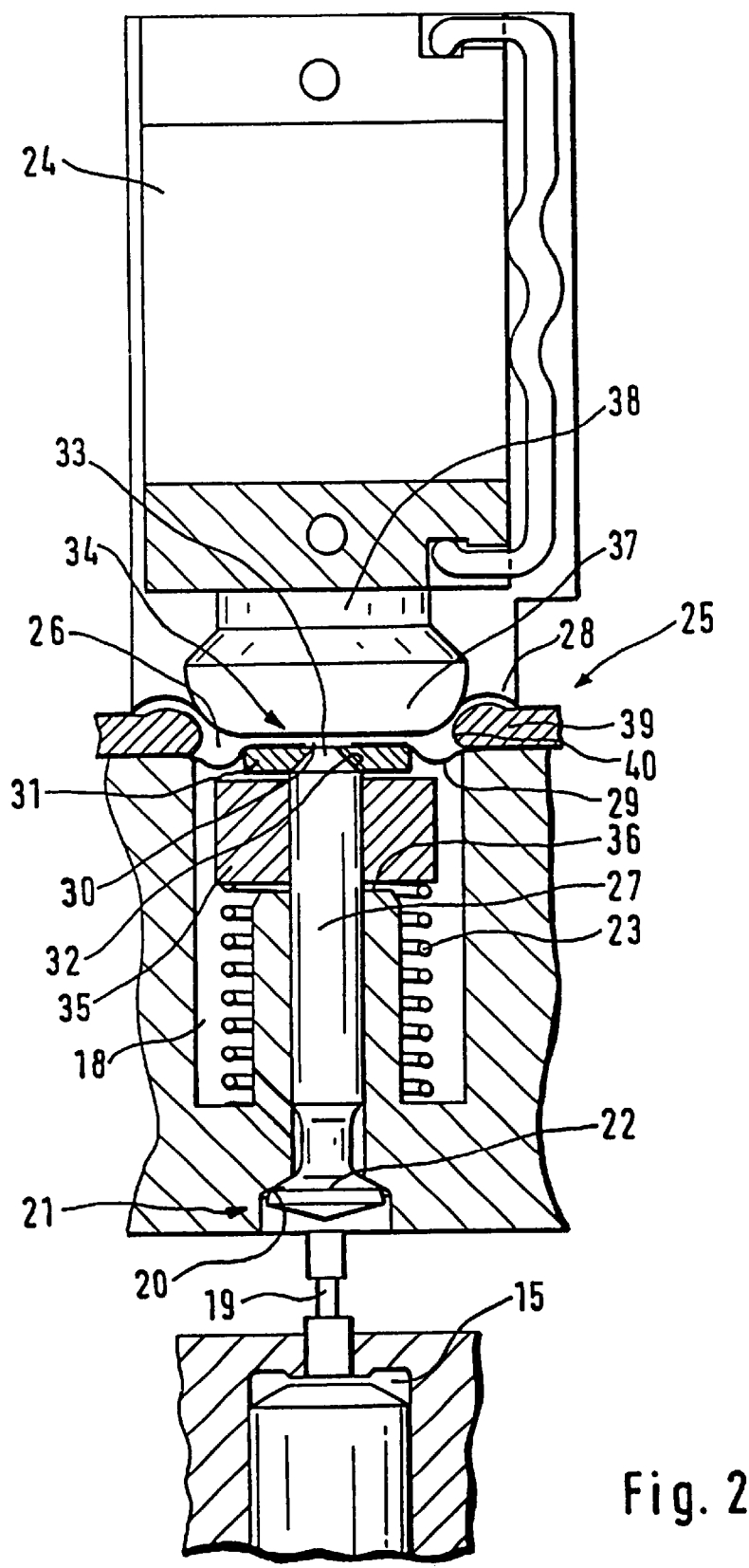
FIG. 2 shows a first exemplary embodiment of a pressure intensifier with a fluid refill valve.

As can be better seen in FIG. 2, the valve according to the invention has a piezoelectric actuator 24 as an actuator, which engages a shaft 27 of the valve member 22 by way of a membrane actuator 25 with a hydraulic coupling chamber 26.

The membrane actuator 25 can be embodied in various ways according to the invention. In FIG. 2, it has two membranes 28, 29 as dividing walls, each of which is provided with an annular bead, of which the membrane 29 oriented toward the shaft 27 of the valve member 22 is provided with a through opening 30 in the center. In the region of the through opening 30, the membrane 29 is connected tightly and firmly to an annular disk 31, whose perforated edge is designated as a valve seat 33 for a closing member 32 of a filling valve 33. The closing member 33 is provided on the upper end of the shaft 27. An annular body 35 is shrink-fitted onto the shaft 27 and this annular body serves as a support for the compression spring and defines the valve stroke of the valve member by means of striking a stop shoulder 36 fixed to the housing.

A ball-shaped end 37 of an actuator piston 38 fastened to the piezoelectric actuator 24 rests fully against the membrane 28 of the membrane actuator 25 that is oriented toward the piezoelectric actuator 24. An affixing wall 39, which is disposed on the outside between the two membranes 28 and 29, is provided with a through opening 40, whose inner wall is rounded in order to assure a rolling away of the membranes 28 and 29.

OPERATION

In the operation of the valve using the piezoelectric actuator 24, it is necessary to compensate for length changes of the piezoelectric actuator 24, the valve itself, or the valve housing 1. This purpose is served by the hydraulic coupling chamber 26, which simultaneously also transmits the stroke motion of the piezoelectric actuator 24. The coupling chamber 26 is thus simultaneously used as a pressure unit and as a length corrector.

Each time the piezoelectric actuator is switched on, a pressure increase occurs in the coupling chamber 26. This pressure exerts a force directed downward onto the shaft 27 of the valve member 22 so that this valve opens. The pressure on the intermediary piece, however, also leads to a fluid loss of the coupling chamber fluid by way of sealing gaps. In order to prevent an evacuation of the coupling chamber 26, the coupling chamber must be refilled. This refilling takes place when the piezoelectric actuator 24 is switched off. Then, the valve member 22 is drawn away from its seat and, on the other end of the shaft 27, the valve seat 32 lifts up from the closing member 33. The prestressing force of the membrane determines the opening pressure at which the valve seat 32 lifts up from the closing member 33. This prestressing force must be very low, e.g. 3N at an opening pressure differential of 1 bar, i.e. the elastic rigidity of the membrane 29 must also be low. This is also important in order to direct a small amount of opposing force counter to the stroke motion.

Fluid flows from the fluid-filled spring chamber 18 by way of the opened filling valve 34 into the hydraulic coupling chamber 26 and once again compensates for the loss that has occurred, which brings about a pressure compensation. Since the lower membrane 29 must transmit the compressive force prevailing in the coupling chamber 26 directly onto the valve member 22, this membrane is reinforced in its center by the annular disk 31.

Figure 3:
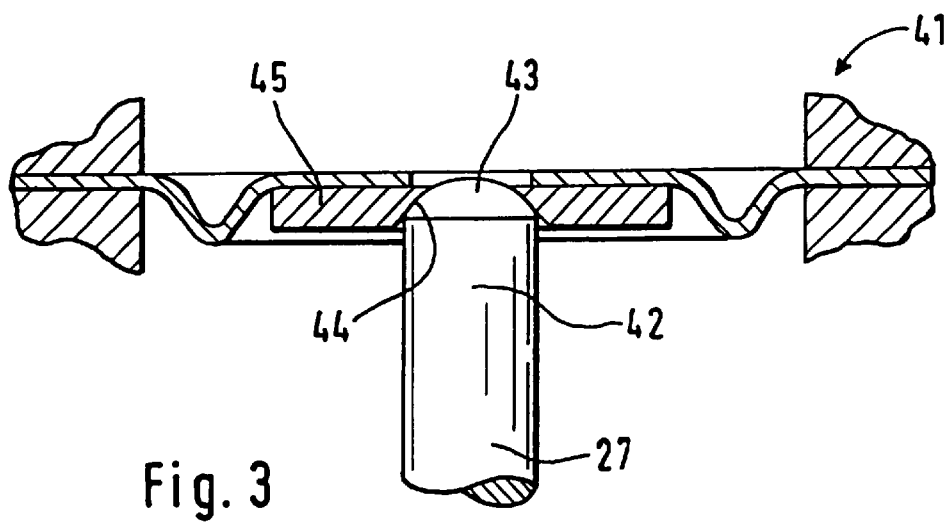
FIG. 3 shows a second type of pressure intensifier with a refill valve.

In the exemplary embodiment according to FIG. 2, the closing member 33 is embodied as conical. As can be seen from FIG. 3, a closing member 42 of a filling valve 41 can also be embodied as ball-shaped, with a head 43 in the form of a section of a ball. An annular disk 45 that constitutes a valve seat 44 can have a conical or a concave opening.

Figure 4:
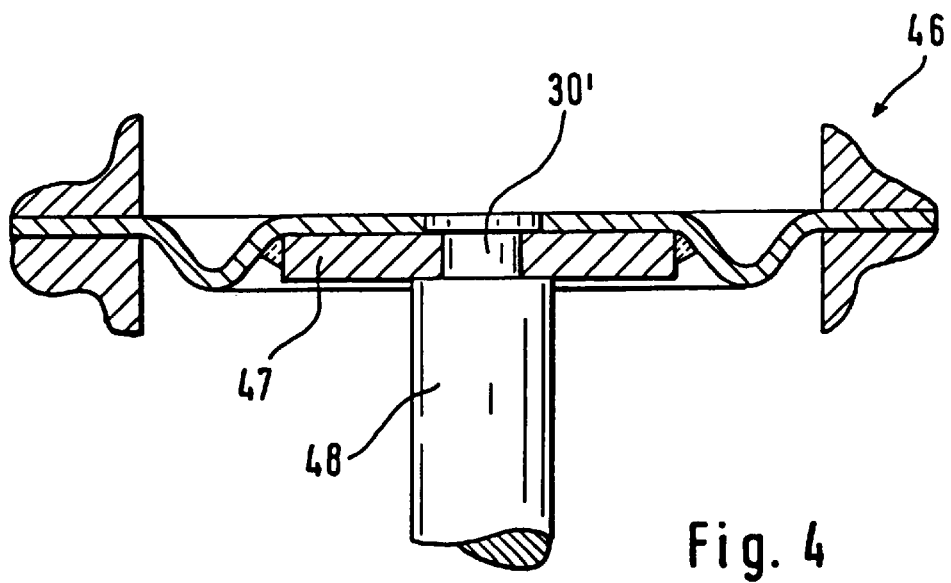
FIG. 4 shows a third type of pressure intensifier, likewise with a refill valve.

FIG. 4 shows another exemplary embodiment of a filling valve 46. In this instance, an annular disk 47 is welded to the membrane 29 and forms a flat seat for the end face of the shaft. The through opening 30' is in turn embodied in the annular disk and the membrane and can be closed by the end face of the shaft 48, which, in the function of a valve member consequently constitutes a flat seat valve together with the annular disk and this valve has a function comparable to the valve embodiments of FIGS. 2 and 3.

The foregoing relates to preferred exemplary embodiments of the invention, it being understood that other variants and embodiments thereof are possible within the spirit and scope of the invention, the latter being defined by the appended claims.

What is claimed is:

1. A valve for controlling fluids, comprising:
   a housing, a bore in said housing, a first valve seat on one end of said bore,
   a valve shaft operable in said bore, a valve member (22) on a first end of said valve shaft,
   said valve member seats against said first valve seat, a compression spring which actuates said valve member (22) to seat on said first valve seat,
   a coupling chamber (26) defined in said housing opposite an upper end of said valve shaft that forms a closing member (33), said coupling chamber including a first membrane (28) that forms a first wall of said coupling chamber,
   a second membrane (29) which forms a second wall of said coupling chamber,
   an annular disk (31) juxtaposed said closing member (33) of said valve shaft, said second membrane includes a central opening at which said second membrane is secured to said annular disk,
   said annular disk includes a central through opening (30) which forms a second valve seat (32) on which said closing member (33) seats, and
   a piezoelectric actuator (24) having a movement when actuated which produces a pressure increase in the coupling chamber (26).

2. The valve according to claim 1, in which a membrane actuator (25) is likewise defined in relation to an actuator piston (38) of the piezoelectric actuator (24) by means of the first membrane (28).

3. The valve according to claim 1, in which an opening stroke of the valve member (22) is defined by an annular body (35), which is shrink-fitted onto the shaft (27, 48) and cooperates with a stop shoulder (36) that is affixed to the housing.

4. The valve according to claim 3, in which a membrane actuator (25) is likewise defined in relation to an actuator piston (38) of the piezoelectric actuator (24) by means of the first membrane (28).

5. The valve according to claim 1, in which the closing member (33, 42) is embodied as part of the shaft (27, 48) of the valve member (22) and that in order to support the membrane (29), the annular disk (31, 45, 47) is provided, which rests directly against the second membrane (29).

6. The valve according to claim 5, in which an opening stroke of the valve member (22) is defined by an annular body (35), which is shrink-fitted onto the shaft (27, 48) and cooperates with a stop shoulder (36) that is affixed to the housing.

7. The valve according to claim 5, in which a membrane actuator (25) is likewise defined in relation to an actuator piston (38) of the piezoelectric actuator (24) by means of the first membrane (28).

8. The valve according to claim 1, in which the second membrane (29) is provided with an annular bead.

9. The valve according to claim 8, in which the closing member (33, 42) is embodied as part of the shaft (27, 48) of the valve member (22) and that in order to support the membrane (29), the annular disk (31, 45, 47) is provided, which rests directly against the second membrane (29).

10. The valve according to claim 8, in which an opening stroke of the valve member (22) is defined by an annular body (35), which is shrink-fitted onto the shaft (27, 48) and cooperates with a stop shoulder (36) that is affixed to the housing.

11. The valve according to claim 8, in which a membrane actuator (25) is likewise defined in relation to an actuator piston (38) of the piezoelectric actuator (24) by means of the first membrane (28).

* * * * *